Patented Oct. 28, 1930

1,779,856

UNITED STATES PATENT OFFICE

BYRAMJI D. SAKLATWALLA, OF CRAFTON, PENNSYLVANIA, ASSIGNOR TO VANADIUM CORPORATION OF AMERICA, OF BRIDGEVILLE, PENNSYLVANIA, A CORPORATION OF DELAWARE

RECOVERY OF VANADIUM FROM ORES OR COMPOUNDS

No Drawing. Application filed October 29, 1927. Serial No. 229,799.

This invention relates to the recovery of vanadium from ores or compounds containing it, and especially from such as contain vanadium compounds which are difficultly soluble in acids or alkalies or other commonly known dissolving agents.

By the commonly known processes of converting vanadium occurring in natural products, such as sulphide ores, vanadium-bearing sandstones, ashes of vanadium-bearing coals and petroleum residues, into soluble compounds, these materials are subjected either to the action of a dissolving acid, such as sulphuric acid, or they are roasted with an alkali to form a soluble vanadate and such vanadates are then dissolved by means of water. The recoveries obtained by such solution processes are low and it is the object of the present invention to effect this with a very much higher degree of recovery and by simpler process steps.

By the process of my invention I have found that chlorine containing gases producing oxygenating chlorine compounds in contact with water have a very strong action on the vanadium content of such difficultly soluble products. It has been proposed to subject such vanadium containing products to the action of dry chlorine gas at a high temperature. Such processes are difficult of carrying out on account of the corrosive action of chlorine gas at high temperature on the apparatus and equipment used for the process. Further, vanadium chloride is a very penetrating and highly fuming and corrosive compound, rendering the processes of dry chlorination all the more difficult. I have discovered that by pulverizing such vanadium compounds and mixing them with water to a pulp and then passing a chlorine containing gas producing oxygenating chlorine compounds in contact with water through such a pulp the entire vanadium content of the material is carried into solution. Chlorine gas is highly oxidizing, and when passed into the aqueous pulp produces oxy compounds which are extremely active in rendering the vanadium content of the ore amenable to water extraction. Due to the highly oxidizing character of the chlorine gas, the vanadium is probably converted into a mixture of vanadium salts including vanadium oxychlorides, vanadium oxides, vanadium sulphate, or vanadium chloride. Sulphides of vanadium, which are not readily attacked by acids, are broken up very readily, the passage of the chlorine gas through the pulp evolving considerable heat energy and enabling the chlorine to unite not only with the vanadium, but also with the sulphur content of such sulphides. In fact, the presence of the sulphides has been found to accelerate the reaction. In general, it may be stated that higher oxide salts are more soluble than lower oxide salts. The action of the chlorine gas, therefore, is much more energetic in extracting the vanadium from the ore than is hydrochloric acid which does not have the oxygenating action, but which, like sulphuric acid, merely forms a solution. While chlorine gas is preferred, other chlorine-containing gases producing oxygenating chlorine compounds in contact with water may be used, such, for example, as sulphur chloride.

The chlorinated pulp thus obtained is then subjected to filtration and the solution which contains the vanadium in the form of water soluble vanadium salts, thus obtained, is then further utilized for recovery of its vanadium content, especially in the form of an oxide, by any of the known processes of precipitation.

By the above described process the vanadium content is obtained readily and with a high degree of recovery and without the necessity of complicated apparatus. The chloride solution is capable of being easily handled in ordinary materials; therefore, the equipment necessary has none of the complications that would be connected with a dry chlorinating process.

I claim:

1. The process for recovering vanadium from ores or other material containing it, which comprises subjecting an aqueous pulp of such material to the action of a chlorine containing gas producing oxygenating chlorine compounds in contact with water.

2. The process of recovering vanadium from ores or other material containing it, which comprises mixing the material in pulverized form with water to form a pulp, passing a chlorine containing gas producing oxygenating chlorine compounds in contact with water through the pulp to convert the vanadium content into soluble form, separating the solution containing the vanadium, and recovering the vanadium from such solution.

3. The process of recovering vanadium from ores or other material containing it, which comprises subjecting an aqueous pulp of such material to the action of chlorine gas.

4. The process of recovering vanadium from ores or other material containing it, which comprises mixing the material in pulverized form with water to form a pulp, passing chlorine gas through the pulp to convert the vanadium content into soluble form, separating the solution containing the vanadium, and recovering the vanadium from such solution.

In testimony whereof I have hereunto set my hand.

BYRAMJI D. SAKLATWALLA.